UNITED STATES PATENT OFFICE.

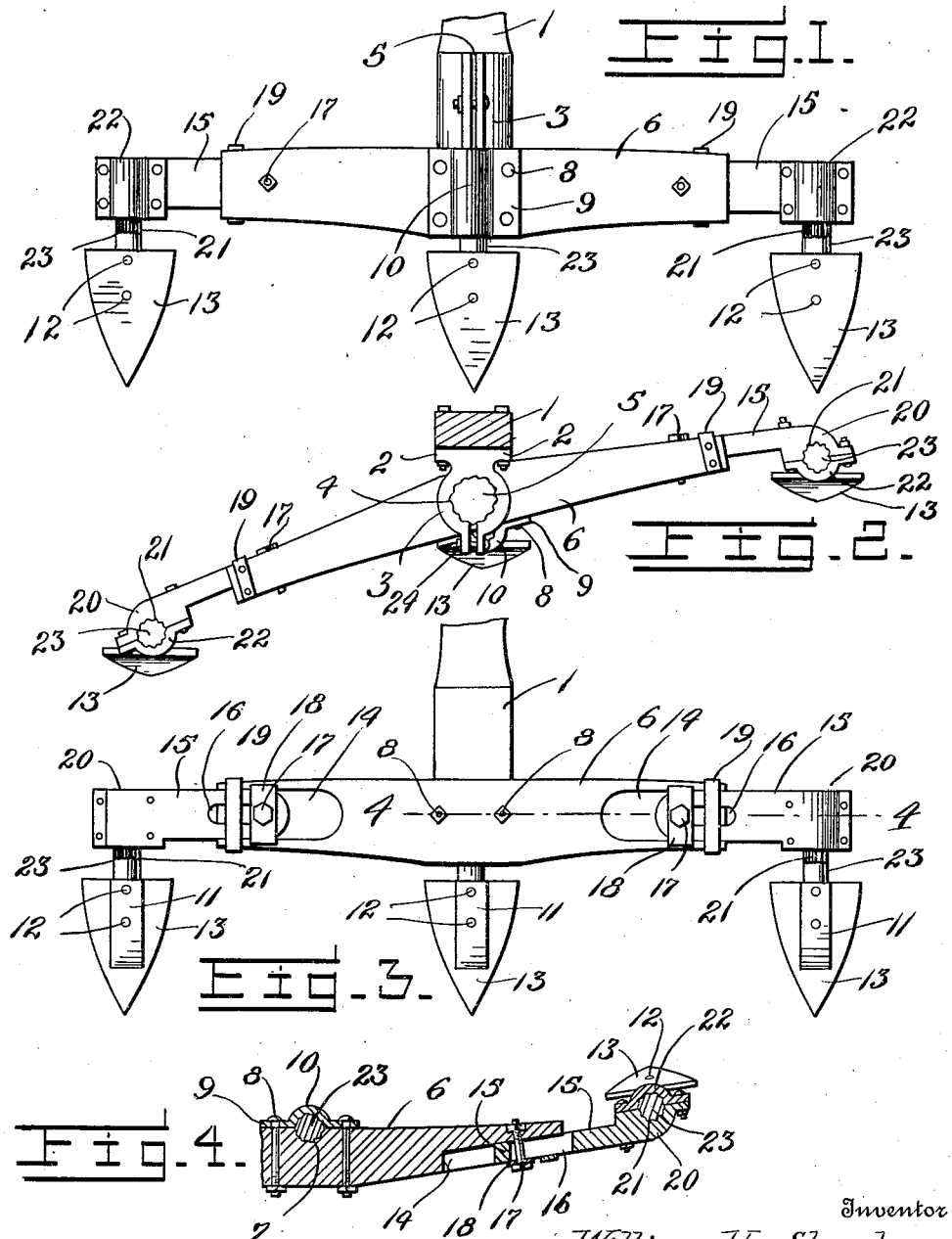

WILLIAM H. SHANK, OF FAIRFAX, IOWA.

AGRICULTURAL IMPLEMENT.

1,007,245.  Specification of Letters Patent.  Patented Oct. 31, 1911.

Application filed June 20, 1911. Serial No. 634,339.

*To all whom it may concern:*

Be it known that I, WILLIAM H. SHANK, a citizen of the United States, residing at Fairfax, in the county of Linn and State of Iowa, have invented certain new and useful Improvements in Agricultural Implements, of which the following is a specification.

My invention relates to improvements in agricultural implements and has for its leading object the provision of an improved cultivator attachment which may be either applied to the frame of an ordinary cultivator to serve to supplement the action of said cultivator or which may be provided with its own frame to provide a cultivator.

A further object of my invention is the provision of an improved cultivator device in which the various parts may be both pivotally and laterally adjusted to cause the cultivator to form either a very wide or narrow furrow or any desired width of furrow.

Another object of my invention is the provision of an improved tang or securing rod for supporting the various shovels or shares of my cultivator, which tang and the receiving boxing or brackets therefor will permit of the adjustment of the share at any desired angle to the line of draft or to the position of the supplemental frame for supporting the shares.

Other objects and advantages will be apparent from the following description, taken in connection with the accompanying drawings, and it will be understood that I may make any modifications in the specific structure shown and described within the scope of my claims without departing from or exceeding the spirit of my invention.

Figure 1 represents a front view of my improved cultivator attachment showing a portion of the supporting beam therefor. Fig. 2 represents a plan view of the attachment as shown in Fig. 1, the parts however being turned to cut a narrow furrow. Fig. 3 represents a rear view of the attachment, and Fig. 4 represents a sectional view on the line 4—4 of Fig. 3.

In the drawings, the numeral 1 designates the beam of a cultivator to which is secured the basal flanges 2 of the split boxing 3 having the central interiorly corrugated socket 4 to engage the exteriorly corrugated lug or tang 5 projecting upward from the slightly curved supplemental beam 6. Said beam 6 has formed in its front face the semicircular longitudinally corrugated groove or recess 7, while secured to the beam by the bolts 8 are the flanges 9 of the bracket member 10 which also has a corrugated groove in the face adjacent the beam, the tightening of the bolts serving to clampingly engage the upper corrugated end of the bar 23 and lock the same in position. Said bar has an enlarged lower end 11 flattened on its front face and rounding forward at its lower end while secured to said enlarged portion 11 by the fastenings 12 is the share or shovel member 13.

Formed in the rear of the beam 6 and extending inwardly from each end is a recess 14, while slidably engaged in said recess is the bar 15 having a slot 16 formed therein through which passes the set screw 17 provided with the spring washer 18 which bears against the rear face of the bar 15 as the set screw is tightened to lock the bar against sliding movement in the recess. Metal plates or bands 19 pass around the beam near each end to inclose the recesses 14 and provide guides for the sliding bar. Said bars are each formed at their projecting end with the half boxing 20 having the inner corrugated recess 21, while secured to said half boxing 20 are the brackets 22 serving to complete the boxing, said bracket, like the bracket 10, being interiorly corrugated and the boxings thus formed being adapted to clampingly engage in adjusted position the tangs of the shares.

In the use of my improved cultivator attachment, I first loosen the set screws 24 to allow the corrugated lug 5 of the beam 6 to be removed from or rotated within the boxing 3, and I then turn the beam 6 until it is set at the desired angle, when by tightening the set screws 24 I am able to lock it in desired position. When it is desired to cut a narrow furrow the parts are disposed in position as shown in Fig. 2, the tangs 23 being adjusted in their respective boxings to cause their shares to each push the soil a little farther outward than did the previous share. When it is desired to cultivate a wide row at one time, I place the beam 6 at right angles to the line of draft, and I then secure the bars 15 in their most extended position, the tangs of the shares 13 being so adjusted as to cause said shares to lie substantially in alinement with the beam 6, the parts then occupying the position shown in Fig. 1.

From the foregoing description taken in connection with the accompanying drawings, the construction of my improved cultivator attachment will be readily understood, and it will be seen that I have provided an improved beam which shall be so secured to the main beam of the agricultural implement as to be universally adjustable with respect thereto, and it will be further observed that I have so secured the various shares to the said supplemental beam that they may be adjusted to lie at any lateral angle with the supplemental beam and the outer shares may be moved toward or away from the central share, thus providing a universally adjustable attachment.

I claim—

1. The combination with an interiorly corrugated split boxing, of a beam having an upwardly projecting exteriorly corrugated lug for engagement in the boxing, a clamp screw for clamping the boxing against the lug to secure the beam in rotatably adjusted position, said beam having a recess extending inward from each end at the rear portion thereof, strips passing around the beam and forming guides across the face of the recesses, a bar slidably mounted in each of the recesses, said bars having longitudinal slots formed therein, a clamp screw passing through each of the slots and engaged in the beam, a spring washer mounted on the clamp screw for engaging the bar to prevent sliding movement thereof, said bar having a half boxing formed on its projecting end, a bracket secured to the half boxing to form the other portion thereof, and a share having an upwardly projecting tang fitting in the boxing, the tightening of the bracket against the half boxing locking the tang against movement in the boxing.

2. A cultivator attachment, comprising a beam having an exteriorly corrugated lug rising therefrom, a securing bracket adapted to clampingly engage said corrugated lug to lock the beam in adjusted position, said beam being formed with a plurality of interiorly longitudinally corrugated half boxings, rods having corrugated ends fitting into said half boxings and having enlarged lower ends, shares secured to said lower ends of the rods, brackets having interiorly grooved recesses formed therein, and means for securing said brackets to the beam and clamping the same against the corrugated ends of the share bearing rods to secure the rods in the half boxings of the beam and preventing the rotation or turning of the shares.

In testimony whereof I affix my signature, in the presence of two witnesses.

WILLIAM H. SHANK.

Witnesses:
 B. F. HOLETS,
 THOS. LOCKHART.

---

Copies of this patent may be obtained for five cents each, by addressing the "Commissioner of Patents, Washington, D. C."